United States Patent [19]

Hasegawa et al.

[11] Patent Number: 4,778,732

[45] Date of Patent: Oct. 18, 1988

[54] ELECTRICALLY CONDUCTIVE GLASS SHEET

[75] Inventors: Jun Hasegawa; Jun Kawaguchi, both of Osaka, Japan

[73] Assignee: Nippon Sheet Glass Company, Osaka, Japan

[21] Appl. No.: 941,217

[22] Filed: Dec. 12, 1986

[30] Foreign Application Priority Data

Dec. 13, 1985 [JP] Japan .......................... 60-192035[U]

[51] Int. Cl.[4] .......................... B32B 17/06; F06B 7/12

[52] U.S. Cl. .................................... 428/630; 428/632; 428/633; 428/673; 428/686; 52/171

[58] Field of Search ............... 428/594, 623, 624, 630, 428/632, 633, 642, 646, 647, 673, 686; 52/171

[56] References Cited

U.S. PATENT DOCUMENTS 3,734,698 5/1973 Postupack .......................... 428/623

FOREIGN PATENT DOCUMENTS 338230 8/1956 Japan .
60-20449 2/1985 Japan .
60-195251 12/1985 Japan .

*Primary Examiner*—L. Dewayne Rutledge
*Assistant Examiner*—George Wyszomierski
*Attorney, Agent, or Firm*—Lowe, Price, LeBlanc, Becker & Shur

[57] ABSTRACT

An electrically conductive glass sheet used as a fog-resistant automotive window glass sheet. The electrically conductive glass sheet comprises a glass sheet, a pair of busbars, an electrically conductive thin film, and protective coatings. The busbars are formed in spaced relation on the surface of the glass sheet by baking electrically conductive paste printed on the surface of the glass sheet. The electrically conductive thin film formed on the surface of the glass sheet has ends or junctions connected to the busbars in overlapping relation to the surfaces of the busbars, the junctions being covered with the protective coatings. Since the junctions are covered with the protective coatings, good electric conductivity through the junctions is ensured for increased fog resistance, and variations from glass sheet to glass sheet are reduced.

7 Claims, 2 Drawing Sheets

ELECTRICALLY CONDUCTIVE GLASS SHEET

BACKGROUND OF THE INVENTION

1. Field of the Invention

The present invention relates to an electrically conductive glass sheet for use as a fog-resistant glass sheet or the like.

2. Description of the Relevant Art

Electrically conductive glass sheets are employed as fog-resistant automotive window glass-sheets, for example. Certain conventional electrically conductive glass sheets include a film formed primarily of a metal oxide on a surface of the glass sheet by vacuum deposition, sputtering, or the like, as disclosed in Japanese Laid-Open Utility Model Publication Nos. 60-20449 and 60-195251, for example.

According to another known process disclosed in Japanese Patent Publication No. 33-8230, a solution containing a tin compound such as tin tetrachloride, dibutyltin oxide, dibutyltin acetate, dibutyltin chloride, or tin alkoxide, for example, is sprayed on or brought into contact with a surface of a glass sheet which is heated, or a glass sheet coated with such a solution is heated, so that the deposited tin compound is decomposed to form a film principally of a tin oxide on the glass sheet surface.

An electric current is passed through the coated film via busbars to heat the film for removing fog from the glass sheet surface.

In the case where the electrically conductive thin film is deposited on the glass sheet by sputtering or the like, the thin film has a thickness of about 0.1 micron. Since the busbars have a thickness ranging from 10 to 20 microns, the electrically conductive thin film tends to be ruptured at localized areas in junctions where it is connected to the busbars. Therefore, the electric conductivity at the junctions is liable to be reduced, thereby increasing the resistance between the busbars, with the result that the current flowing through the thin film is reduced and no sufficient heat can be produced by the thin film. Therefore, the fog resistances of the conventional electrically conductive glass sheets vary from glass sheet to glass sheet, and some of them may fail to provide a desired degree of fog resistance.

Another known anti-fog glass heat includes hot wires extending between and connected to busbars, the hot wires having wider portions connected to the busbars. However, this arrangement cannot be employed in glass sheets coated with electrically conductive thin films.

SUMMARY OF THE INVENTION

It is an object of the present invention to provide an electrically conductive glass sheet which provides good electric conductivity through junctions between busbars and an electrically conductive thin film to prevent the electric resistance between the busbars from being increased, for thereby increasing the fog resistance capability of the glass sheet and allowing uniform glass sheets to be produced.

To achieve the above object, there is provided an electrically conductive glass sheet comprising a glass sheet having a surface, a pair of busbars formed in spaced relation on the surface of the glass sheet by baking electrically conductive paste printed on the surface of the glass sheet, an electrically conductive thin film formed on the surface of the glass sheet and having junctions connected to the busbars, and protective coatings formed on the electrically conductive thin film in covering relation to the junctions.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
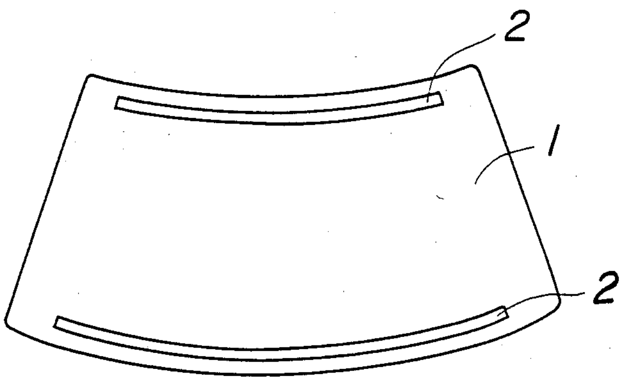
FIGS. 1 through 3 are plan views showing a process of forming an electrically conductive glass sheet according to the present invention.

As shown in FIG. 1, a pair of busbars 2 is formed on a surface of a glass sheet 1 by printing electrically conductive paste, as by the silkscreen printing process, and baking the printed paste with the heat applied when the glass sheet 1 is heated and bent. Each of the busbars 2 has a thickness in the range of from 10 to 20 microns.

The electrically conductive paste may be of a kneaded mixture of glass powder (frit) of a low melting point containing fine metal particles such as of Ag, Cu, or Pd, for example, and an organic solvent or a binder such as methyl alcohol, ethyl alcohol, propyl alcohol, higher alcohol, or ester such as acetate or propionate.

Figure 2:
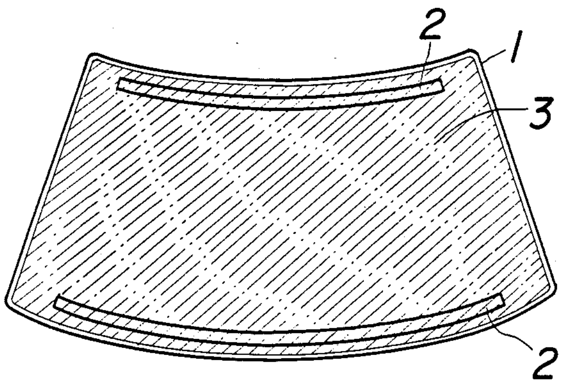

Thereafter, an electrically conductive thin film 3 is formed substantially over the entire surface of the glass sheet 1 in overlapping relation to the busbars 2, as shown in FIG. 2.

When baking the electrically conductive paste to form the busbars, $SiO_2$ contained in the paste emerges on the busbar surface, tending to reduce the electric conductivity between the busbars 2 and the electrically conductive thin film 3. This would increase the electric resistance between the busbars 2, so that the amount of heat produced by the thin film 3 would be reduced, resulting in a lowered fog resistance capability. To prevent this drawback, it is preferable, before the electrically conductive thin film 3 is formed, to rub the surfaces of the busbars 2 with steel wool or the like over a width of 0.5 mm or more or, preferably, 1 mm or more, to a depth ranging from 1 to 5 microns for removing an $SiO_2$—rich layer from the busbar surfaces, or to scratch the busbar surfaces with a brush or the like.

The electrically conductive thin film 3 comprises a lamination of thin metal layers, which may be constructed as described below.

The first layer of the thin film 3 is formed of indium oxide ($In_2O_3$), tin oxide ($SnO_2$), or their mixture by cathode sputtering. The first layer is of a thickness ranging from 30 to 50 nm, preferably 40 nm. Where the first layer is formed of the oxide mixture, the target is made of an alloy composed of 80 to 90 wt % of indium, 5 to 10 wt % of tin, and 2 to 15 wt % of lead, for example. Where the first layer is formed of the tin oxide, the target is made of an alloy composed of 85 to 98 wt % of tin and 2 to 15 wt % of lead, for example.

The second layer is formed of silver and deposited on the surface of the first layer by cathode sputtering. The second layer has a thickness ranging from 5 to 15 nm, preferably 10 nm. Preferably, the target contains 0.001 to 1.0 wt % of nickel for improving the homogeneity of the silver layer.

The third layer, which is deposited on the surface of the second layer by cathode sputtering, is made of a metal which may be aluminum, titanium, tantalum, chromium, manganese, or zirconium. By thus forming the metal layer on the surface of the silver layer, the silver layer is prevented from being cracked when forming a metal oxide layer as the fourth layer by cathode sputtering.

The fourth layer finally deposited on the surface of the third metal layer is formed of the same metal oxide as the first layer, i.e., indium oxide, tin oxide, or their mixture.

Figure 3:
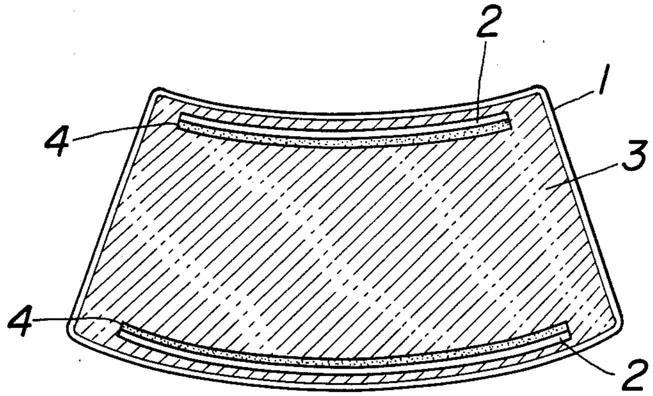
Figure 4:
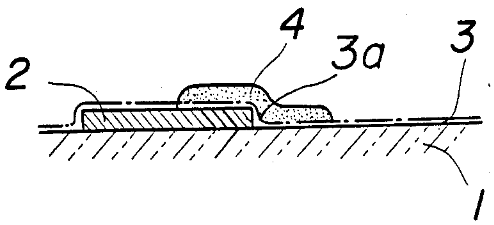
FIG. 4 is an enlarged fragmentary cross-sectional view of the glass sheet.

Then, as shown in FIGS. 3 and 4, protective coatings 4 are formed by coating electrically conductive resin paste such as organic Ag paste, for example, on boundary regions between the busbars 2 and the thin film 3, i.e., on the upper surfaces of the junctions *3a* of the thin film 3 with the busbars 2, and thereafter baking the coated paste.

The paste thus coated and baked may be of the silver-acryl one-part type or the silver-epoxy two-part type.

In an experiment, no protective coatings were formed, and a voltage ranging from 12 to 36 volts was applied between the terminals to pass an electric current between the busbars. The boundary regions between the busbars and the thin film were slightly heated abnormally or sparked. When a current was passed for 20 minutes under the voltage of 36 volts, localized ruptures were caused, increasing the electric resistance from 2.6 to 5.2 ohms. On the other hand, the boundary regions between the busbars and the thin film were coated, by a brush, with organic Ag paste (manufactured by Fujikura Kasei Co., Ltd. under the tradename "XG=#300"). When a current was passed for 5 minutes under 36 volts repeatedly in 1,000 cycles, no increase in the electric resistance resulted. Variations in the initial resistance were reduced.

The organic Ag paste may be replaced with a solder coating applied by high-frequency heating.

According to the present invention, as described above, protective coatings are formed by coating electrically conductive resin paste on the junctions between busbars and an electrically conductive thin film, for thereby preventing any rupture from being caused between the busbars and the electrically conductive thin film. Therefore, the electric conductivity between the busbars and the electrically conductive thin film is rendered stable to eliminate any increase and variations in the electric resistance between the busbars. The electrically conductive thin film is thus capable of producing a sufficient amount of heat for increased fog resistance.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:

1. An electrically conductive glass sheet comprising:

a glass sheet having a surface;

a pair of electrically conductive busbars spaced apart from each other on said surface of the glass sheet;

an electrically conductive thin film formed on said surface of the glass sheet and on said busbars; said electrically conductive thin film including a plurality of conductive layers and being in electrical contact with said busbars; and protective coatings coated on said electrically conductive thin film at boundary regions between the thin film and the busbars so as to protect the electrial contact therebetween.

2. An electrically conductive glass sheet as recited in claim 1 wherein said protective coatings comprise a resin paste coated on boundary regions between the said busbars and said electrically conductive thin film.

3. An electrically conductive glass sheet as recited in claim 2 wherein said resin paste comprises organic silver paste.

4. An electrically conductive glass sheet according to claim 1 wherein said electrically conductive thin film comprises a lamination of thin layers including:

a first layer formed of an oxide from the group consisting of indium oxide, tin oxide, and their mixture;

a second layer formed of silver and deposited on a surface of the first layer; and a third layer, formed of a metal from the group consisting of aluminum, titanium, tantalum, chromium, manganese, and zirconium, said third layer deposited on a surface of the second layer.

5. An electrically conductive glass sheet comprising:

a glass sheet having a surface;

a pair of busbars spaced apart from each other on said surface of the glass sheet and having been made by baking electrically conductive paste printed on said surface of the glass sheet;

an electrically conductive thin film formed on said surface of the glass sheet and having junctions connected to said busbars; and protective coatings formed on said electrically conductive thin film covering said junctions so as to protect the electrical contact between the thin film and the busbars.

6. An electrically conductive glass sheet comprising:

a glass sheet having a surface;

a pair of busbars spaced apart from each other on said surface of the glass sheet and having been made by baking electrically conductive paste printed on said surface of the glass sheet;

an electrically conductive thin film formed on said surface of the glass sheet and said busbars and having junctions connected to said busbars; and protective coatings formed on said electrically conductive thin film in covering relation to said junctions;

said protective coatings including a resin paste coated on boundary regions between said busbars and said electrically conductive thin film, said resin paste comprising organic silver paste.

7. An electrically conductive glass sheet as recited in claim 6 wherein said electrically conductive thin film comprises a lamination of thin layers, including:

a first layer formed of an oxide from the group consisting of indium oxide, tin oxide, and their mixture;

a second layer formed of silver and deposited on a surface of the first layer; and a third layer, formed of a metal from the group consisting of aluminum, titanium, tantalum, chromium, manganese, and zirconium, said third layer deposited on a surface of the second layer.

* * * * *